United States Patent [19]

Kawabe

[11] Patent Number: 5,358,196
[45] Date of Patent: Oct. 25, 1994

[54] DRAG MECHANISM FOR A SPINNING REEL

[75] Inventor: Yuzo Kawabe, Izumi, Japan

[73] Assignee: Shimano Inc., Osaka, Japan

[21] Appl. No.: 836,374

[22] Filed: Feb. 18, 1992

[30] Foreign Application Priority Data

Feb. 20, 1991 [JP] Japan .............. 3-007517[U]

[51] Int. Cl.$^5$ .............................. A01K 89/027
[52] U.S. Cl. ........................................ 242/246
[58] Field of Search ........................ 242/245, 246

[56] References Cited

U.S. PATENT DOCUMENTS

| | | | |
|---|---|---|---|
| 3,682,411 | 8/1972 | Dumbauld | 242/246 |
| 4,153,219 | 5/1979 | Kamikawa | 242/246 |
| 4,173,317 | 11/1979 | Hamayasu et al. | 242/246 X |
| 4,702,432 | 10/1987 | Kaneko et al. | 242/246 |
| 4,728,053 | 3/1988 | Hitomi | 242/246 |
| 4,732,344 | 3/1988 | Maruyama et al. | 242/246 |
| 4,735,375 | 4/1988 | Tunoda et al. | 242/246 |
| 5,149,007 | 9/1992 | Saito | 242/246 |

FOREIGN PATENT DOCUMENTS 63-68773 5/1988 Japan .............. 242/246

Primary Examiner—Daniel P. Stodola
Assistant Examiner—Michael R. Mansen
Attorney, Agent, or Firm—Dickstein, Shapiro & Morin

[57] ABSTRACT

A drag mechanism for a spinning reel includes a pressing member mounted on a spool shaft not to be rotatable relative thereto, a frictional section formed on a front surface of a spool, and a control member meshed with a screw portion at a forward end of the spool shaft for applying a pressure to the pressing member to adjust a contact pressure between the pressing member and frictional section. The control member includes a tubular portion adjacent the pressing member and coaxial with the spool shaft, the tubular portion defining a toothed surface and a large diameter portion having a larger diameter than the toothed surface. The pressing member carries a resilient element extending through openings in the pressing member into contact with the toothed surface forwardly of the large diameter portion. The resilient element is engageable with and disengageable from the toothed surface to produce a sound when the control member is turned.

12 Claims, 4 Drawing Sheets

DRAG MECHANISM FOR A SPINNING REEL

BACKGROUND OF THE INVENTION

1. Field of the Invention

The present invention relates to a drag mechanism for a spinning reel, and more particularly to a technique of facilitating handling of a drag mechanism for a spinning reel comprising a pressing member mounted on a spool shaft not to be rotatable relative thereto, a frictional section formed on a front surface of a spool, and a control member meshed with a screw portion at a forward end of the spool shaft for applying a pressure to the pressing member to adjust a contact pressure between the pressing member and frictional section.

2. Description of the Related Art

A conventional drag mechanism as constructed above is disclosed in Japanese Utility Model Publication Kokai No. 1988-68773. The conventional drag mechanism includes a pressing member mounted on is sleeve not to be rotatable relative thereto, which in turn mounted on a spool shaft not to be rotatable relative thereto, and a disk fitted between the presser member and a front surface of the spool. A control member is meshed with a screw portion at a forward end of the spool shaft for applying a pressure to the pressing member. In this drag mechanism, the spool and pressing member are linked together such that the pressing member does not fall off the spool shaft when the control member is removed from the spool shaft.

This prior construction has the advantage that the angler does not easily lose the pressing member since the pressing member does not fall off the spool shaft when the control member is removed from the spool shaft. The drag mechanism of this type applies a braking force mainly to friction surfaces between the pressing member and disk. It is troublesome to expose the friction surfaces when a foreign matter has entered between these surfaces, for example. Further, according to the prior construction, since the control member is simply meshed with the spool shaft, the control member may become loose in the course of use to diminish drag. There is room for improvement in this sense.

SUMMARY OF THE INVENTION

Having regard to the disadvantages of the prior art noted above, the object of the present invention is to provide an improved drag mechanism which reduces the chances of losing the pressing member when the control member is removed from the spool shaft. facilitates maintenance of the friction surfaces, and checks drag diminution occurring in the course of use.

The above object is fulfilled, according to the present invention, by a drag mechanism for a spinning reel comprising a pressing member, a frictional section formed on a front surface of a spool, and a control member meshed with a screw portion at a forward end of the spool shaft as noted hereinbefore, wherein the control member includes a tubular portion adjacent the pressing member and coaxial with the spool shaft, the tubular portion defining a toothed surface and a large diameter portion having a larger diameter than the toothed surface, and wherein the pressing member carries a resilient element extending through openings in the pressing member into contact with the toothed surface forwardly of the large diameter portion, the resilient element being engageable with and disengageable from the toothed surface to produce a clicking sound when the control member is turned.

This drag mechanism has the following functions and effects.

The above features may be incorporated into the construction shown in FIGS. 1 through 3, for example. When the control member 23 is turned, the control member 23 and pressing member 25 rotate relative to each other. Thus a, clicking sound is produced by a spring 27 engaging with and disengaging from the toothed surface 23A. When the control member 23 is removed from the spool shaft 13, the spring 27 contacts the large diameter portion 28 to prevent separation of the control member 23 and pressing member 25. Moreover, when the control member 23 is removed from the spool shaft 13, the control member 23 and pressing member 25 separate together from the spool 5, to expose friction surfaces between the pressing member 25 and disk 26.

According to this construction, when the control member 23 is turned, the engagement and disengagement of the spring 27 and toothed surface 23A apply a resistance to turning of the control member 23 while producing a clicking sound. When the control member 23 is removed from the spool shaft 13, the pressing member 25 does not fall off, and the friction surfaces are exposed without requiring a special operation.

Thus, the present invention provides an improved drag mechanism which reduces the chances of losing the pressing member when the control member is removed from the spool shaft, facilitates maintenance of the friction surfaces, and checks drag diminution occurring in the course of use.

According to the present invention, particular, since a clicking sound is produced whenever the control member is turned, an amount of operation in adjusting the braking force of the drag mechanism may be grasped by the ear as well as the feel of the hand.

Other features and advantages of the present invention will be apparent from the following description of the preferred embodiment.

DETAILED DESCRIPTION OF THE PREFERRED EMBODIMENT

Figure 1:
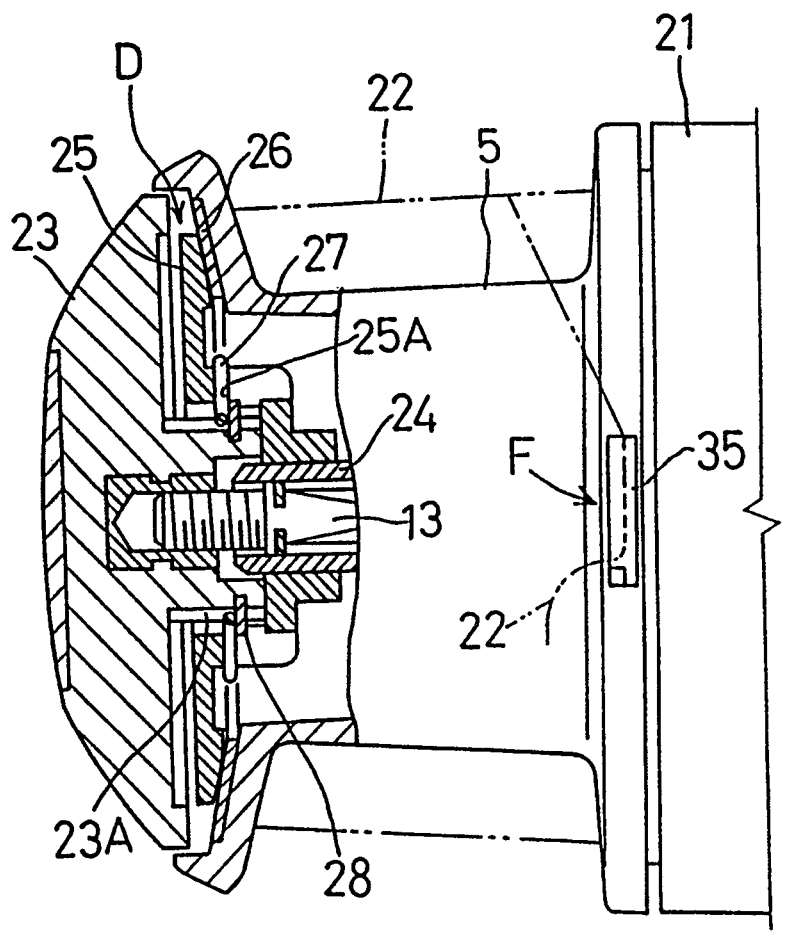
FIG. 1 is a side view, partly in section of a forward portion of a spool.

A drag mechanism for a spinning reel according to the present invention will be described in detail with reference to the drawings.

As shown in FIGS. 1 through 6, this spinning reel includes a handle 1 attached to a reel body 2, a rotor 4 carrying a bail 3 and mounted on a forward portion of the reel body 2, and a spool 5 connected to the forward portion of the reel body 2. The spinning reel further includes a drive system for transmitting drive from a drive gear 7 driven by a handle shaft 6 to the rotor 4 through a pinion gear 8 and a sleeve shaft 9, and a drive system for transmitting drive from the pinion gear 8 to a spool shaft 13 after converting the drive into a reciprocal motion through an oscillating mechanism including an input gear 10, a screw shaft 11 and a slider 12.

Figure 5:
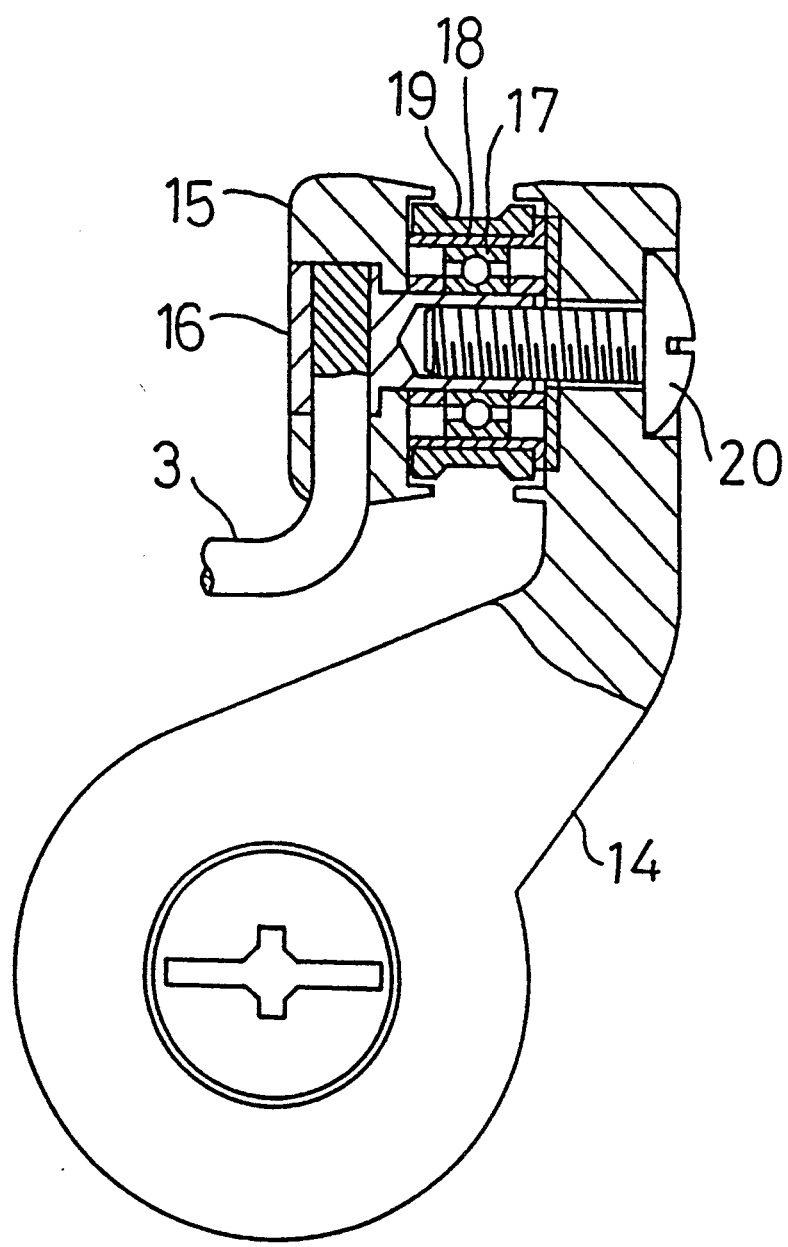
FIG. 5 is a sectional view showing a support structure for a line roller.
Figure 6:
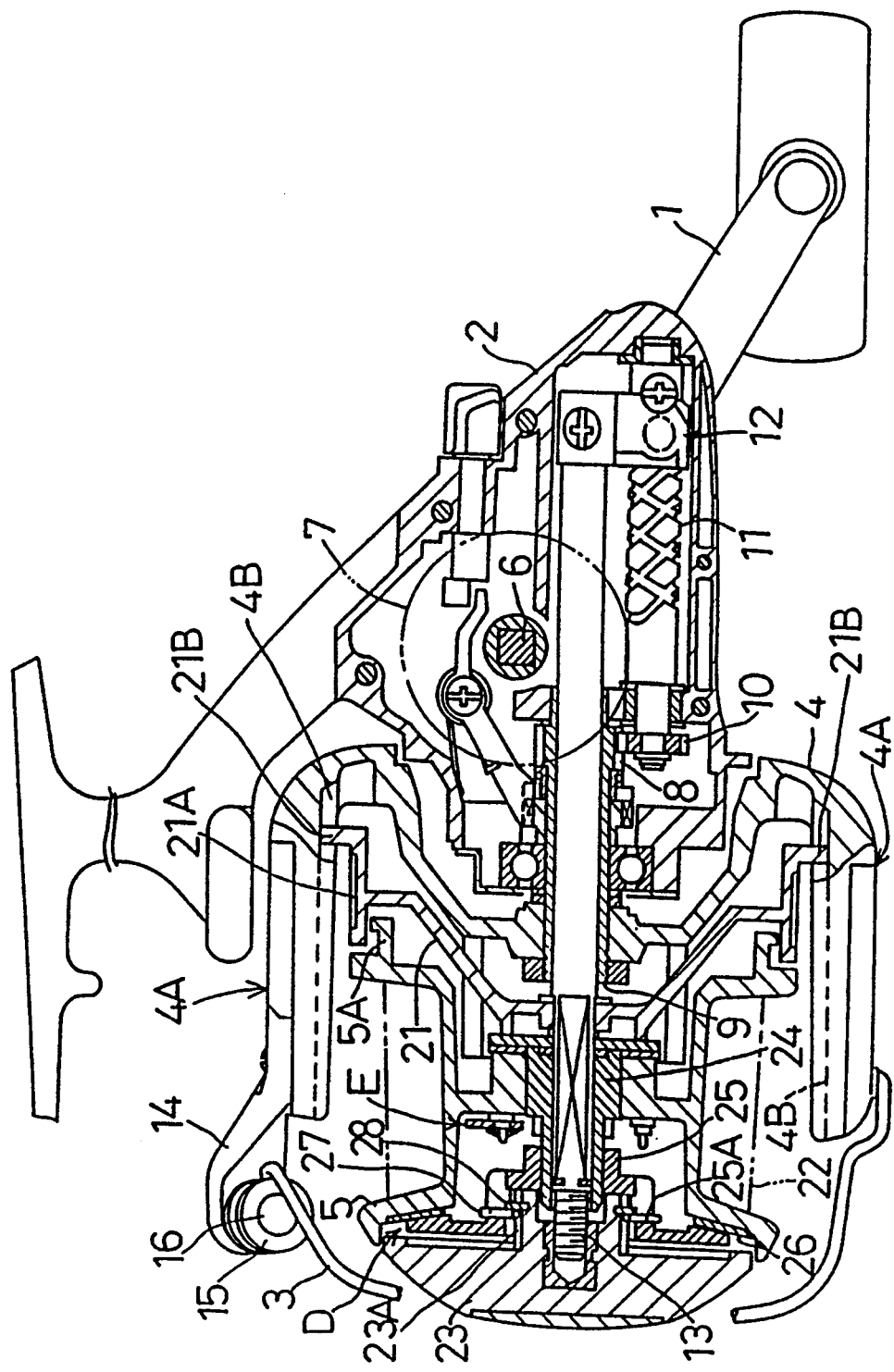
FIG. 6 is a side view in vertical section of a spinning reel.

The rotor 4 has arms 4A. The bail 3 is connected to an oscillating arm 14. As shown in FIG. 5, a line roller 19 is rotatably supported on the oscillating arm 14 through a retainer 15, a clamp 16, a ball bearing 17 and a collar 18. The clamp 16 is drawn tight to the oscillating arm 14 by a screw 20, thereby holding the bail 3 extending through the retainer 15 and clamp 16.

Between the spool 5 and reel body 2 is a line retainer 21 having an annular portion 21A surrounding a rear end of a skirt 5A of the spool 5. The line retainer 21 is rotatably mounted on the spool shaft 13, and further includes a pair of projecting pieces 21B extending into grooves 4B defined in inner walls of the arms of the rotor 4.

The spinning reel includes a disk type drag mechanism D for acting on a front surface of the spool 5. The spool 5 contains an indicating device E for indicating thickness of a fishing line 22 wound on the spool 5. Further, as shown in FIG. 4, the spool 5 includes a line stopper F mounted on the skirt 5A of the spool 5 for holding an end of the fishing, line 22.

Figure 2:
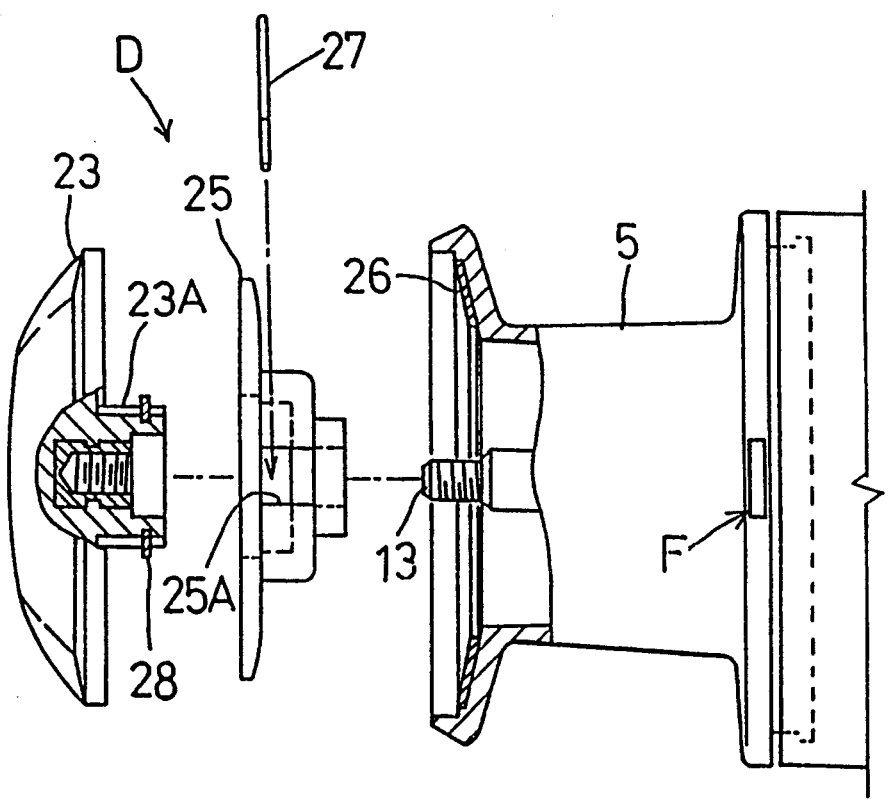
FIG. 2 is an exploded view showing the structure of a drag mechanism.
Figure 3:
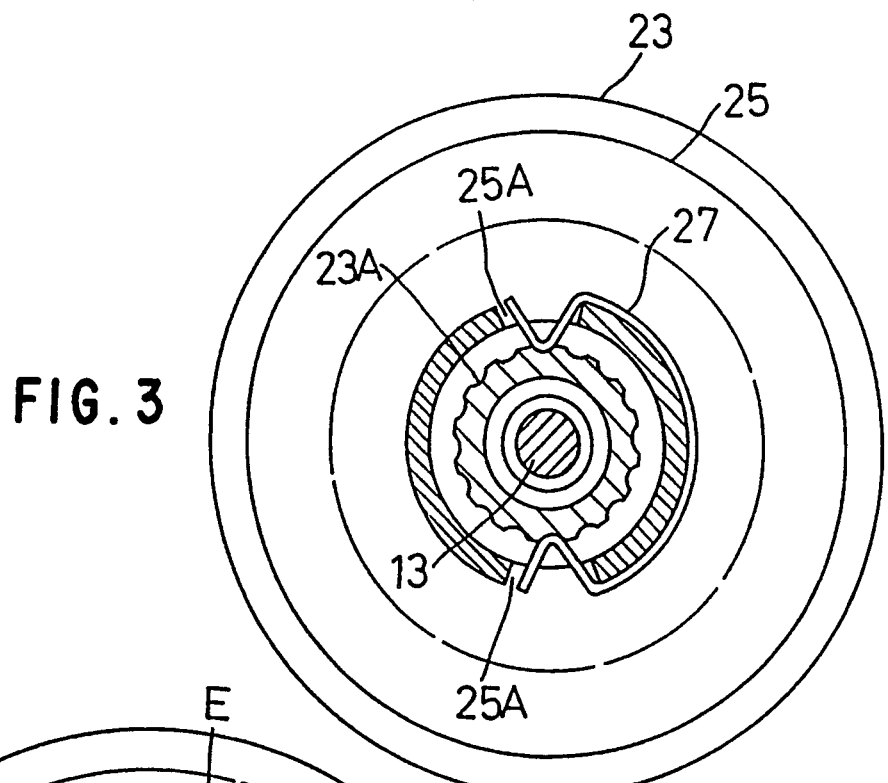
FIG. 3 is a front view in vertical section of the forward portion of the spool.

As shown in FIGS. 1 through 3, the drag mechanism D includes a control member 23 meshed with a screw portion at a forward end of the spool shaft 13, a pressing member 25 mounted on a sleeve 24 not to be rotatable relative thereto, which is in turn mounted on the spool shaft 13 not to be rotatable relative thereto, and a disk 26 (one example of frictional sections) fitted between the presser member 25 and a front surface of the spool 5. With this drag mechanism D, a braking force acting on the spool 5 in rotation is adjustable by turning the control member 23 to adjust a contact pressure between the pressing member 25 and disk 26. The drag mechanism D further includes a spring 27 mounted on a tubular portion of the pressing member 25 to be engageable with a toothed surface 23A of a tubular portion of the control member 23 to produce a clicking sound when the control member 23 is turned. Besides contacting the toothed surface 23A through openings 25A formed in the tubular portion of the pressing member 25 to produce the sound, the spring 27 contacts a clip 28 (one example of large diameter portions) attached to an outer surface of the tubular portion of the control member 23 to prevent separation of the control member 23 and pressing member 25.

Figure 4:
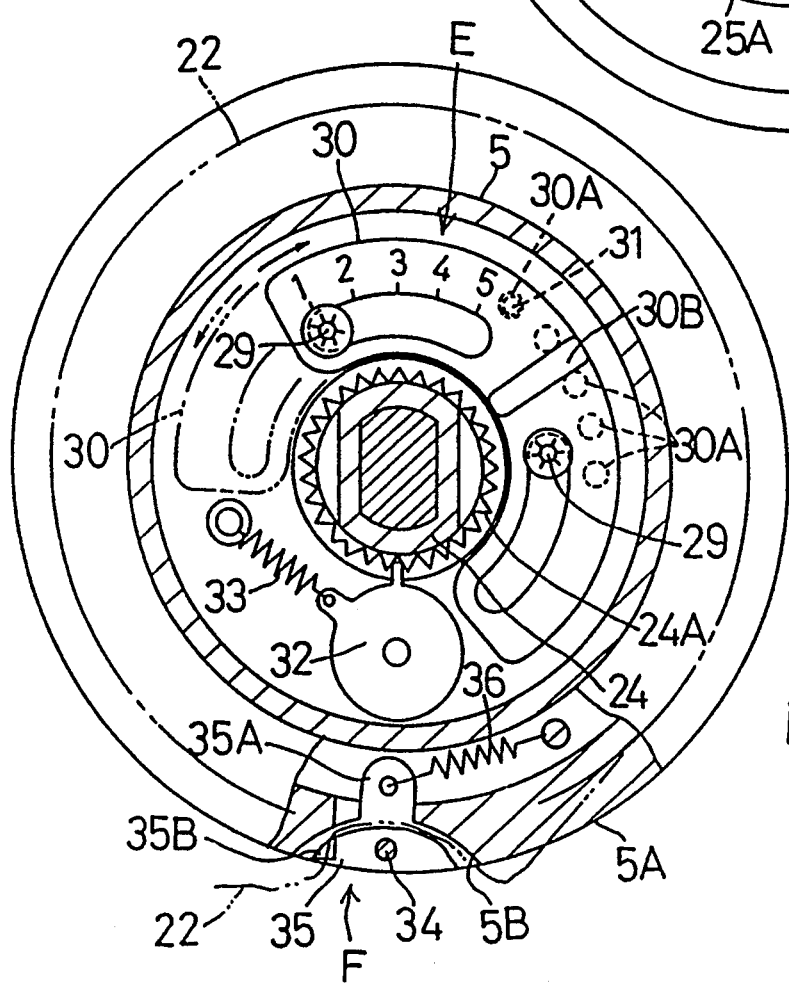
FIG. 4 is a front view in vertical section of the spool.

As shown in FIG. 4, the indicating device E includes a plate 30 supported through a pair of pins 29 on a front surface defining an interior space of the spool 5, the plate 30 being movable to describe a locus around an axis of the spool shaft 13, and a projection 31 formed on the spool 5 for engaging recesses 30A formed on a back surface of the plate 30. The plate 30 includes a grip 30B projecting from the front surface thereof. The user may hold the grip 30B for moving the plate 30 to register one of the pins 29 with a numeral shown on the front surface of the plate 30 in accordance with the thickness of the fishing line 22 wound on the spool 5.

The spool 5 contains, in its interior space, a sound producing element 32 urged by a spring 33 to be engageable with a toothed outer surface 24A of the sleeve 24 to produce a clicking sound when the spool 5 is rotated.

As shown in FIG. 4, the line stopper F does not protrude from an outer surface of the skirt 5A of spool 5 as seen axially of the spool 5. Specifically, the line stopper F includes an engaging element 35 fitted in a recess 5B formed in the skirt 5A to be pivotable on an axis 34, and an urging mechanism 36 formed of a spring for acting on an arm 35A of the engaging element 35 to set the engaging element 35 to a position not protruding from the skirt 5A. This engaging element 35 has a seesaw-like structure with the axis 34 acting as a fulcrum so that, when one end of the engaging element 35 is pressed toward the spool axis, the other end is raised. A line holder 35B is formed on the other end of the engaging element 35, which includes an inclined surface resulting in a reduced thickness of the other end.

For placing the fishing line 22 in engagement with the engaging element 35, one end of the engaging element 35 is pressed toward the spool axis to raise the other end. The fishing line 22 is placed between the raised end and the skirt 5A, and then the pressing force is removed. As a result, the fishing line 22 is pinched between the other end of the engaging element 35 and an opening edge of the recess 5B. The fishing line 22 is retained in place by the urging force of the urging mechanism 36.

The foregoing embodiment may be modified to include a frictional section formed on the front surface of the spool 5 without using the disk. The present invention may be practiced in various other ways, e.g. forming the large diameter portion 28 as an integral part of the tubular portion, and placing the pressing member 25 directly on the spool shaft 13.

What is claimed is:

1. A drag mechanism for a spinning reel comprising:
    a pressing member mounted on a spool shaft to be unrotatable relative thereto:
    an annular frictional section formed on a front surface of a spool, said frictional section having an inner diameter; and
    a control member meshed with a screw portion at a forward end of said spool shaft for applying a pressure to said pressing member to adjust a contact pressure between said pressing member and said frictional section;
    wherein said control member includes a tubular portion adjacent said pressing member and coaxial with said spool shaft, said tubular portion defining a toothed surface with radially outward directed teeth, and a large diameter portion, said toothed surface having an outer diameter, said large diameter portion having an outer diameter, said outer diameter of said large diameter portion being greater than said outer diameter of said toothed surface, said outer diameter of said large diameter portion being less than said inner diameter of said frictional section, and said pressing member carries a resilient element extending through openings in said pressing member into contact with said toothed surface forwardly of said larger diameter portion, said resilient element being engageable with the disengageable from said toothed surface to produce a sound when said control member is turned.

2. A drag mechanism as claimed in claim 1, wherein said frictional section includes a disk fitted between said pressing member and the front surface of said spool.

3. A drag mechanism as claimed in claim 2, wherein said large diameter portion is a clip mounted on the tubular portion of said control member.

4. A drag mechanism for a spinning reel comprising:
    a spool shaft;

a spool rotatably mounted on said spool shaft, said spool having a frictional surface;

a pressing member non-rotatably but axially movably mounted on said spool shaft, said pressing member including an interacting surface facing said frictional surface;

a control member, axially movably mounted on said spool shaft, for controlling a pressing force of said interacting surface of said pressing member onto said frictional surface;

an engageable portion provided on said control member, said engageable portion extending radially of said spool shaft; and engaging means provided on said pressing member for being engaged with said engageable portion during an axial movement of said control member, said engaging means having a protruding portion extended radially of said spool shaft to engage said engageable portion, wherein the engagement between said protruding portion and said engageable portion prevents said pressing member from falling off form said control member, wherein said engaging means is resiliently movable in a radial direction with respect to said spool shaft for contacting said engageable portion of said control member.

5. A drag mechanism of claim 4, wherein said control member includes a first boss portion extending toward said spool, said engageable portion (28) being supported by said first boss portion, said pressing member including a second boss portion, and wherein said second boss portion of said pressing member coaxially surrounds said first boss portion of said control member, and wherein said engaging means (27) is supported by said second boss portion of said pressing member.

6. A drag mechanism of claim 5, wherein said engageable portion includes an annular plate supported on an outer periphery of said first boss portion of said control member.

7. A drag mechanism of claim 5, wherein said engaging means includes an annular spring, said annular spring having an arcuate portion surrounding a portion of said second boss portion of said pressing member and a bent portion bent radially inwardly to form said protruding portion.

8. A drag mechanism of claim 7, wherein said second boss portion of said pressing member includes an opening (25A) for receiving said bent portion of said annular spring.

9. A drag mechanism of claim 7, wherein the outer periphery of said first boss portion of said control member includes engaging recesses (23A), said annular spring being arranged such that said bent portion is extendible into said engaging recesses.

10. A drag mechanism of claim 9, wherein said bent portion is arranged to move over said engaging recesses to generate a clicking sound.

11. A drag mechanism of claim 9, wherein engagement between said bent portion and said engaging recesses provides resistance to rotation of said control member relative to said pressing member.

12. A drag mechanism of claim 4, wherein:

said spool shaft includes a forward extremity, and a threaded portion located at said forward extremity;

said spool includes a radially enlarged portion, said enlarged portion including a forwardly directed face, said frictional surface (26) being provided on said forwardly directed face; and said pressing member (25) includes:

a base portion mounted on said spool shaft (13), a connecting portion extending forwardly from said base portion in a direction substantially parallel to said spool shaft to define an inner space, said connecting portion having a hole leading into said space, and a disc portion extending radially outwardly from said connecting portion, said disc portion having a rearwardly directed face, said interacting surface being defined on said rearwardly directed face, said interacting surface being in contact with said frictional surface of said spool; and said control member is threaded onto said threaded portion of said spool shaft, said control member having a boss portion extending substantially parallel to said spool shaft, said boss portion of said control member being located within said inner space defined by said pressing member, said boss portion of said control member being in contact with said base portion of said pressing member, said boss portion of said control member having an outer surface, and a plurality of engaging recesses circumferentially arranged on said outer surface;

said engageable portion includes a flange member (28) extending radially outwardly from said outer surface of said boss portion of said control member; and said engaging means is fixed by said hole of said connecting portion of said pressing member and is fixed circumferentially and axially of said boss portion of said control member, and wherein said protruding portion is engageable with said engaging recesses of said control member.

* * * * *